(12) United States Patent
Reial (10) Patent No.: US 9,071,482 B2
(45) Date of Patent: Jun. 30, 2015

(54) POWER ESTIMATION FOR WIRELESS COMMUNICATION DEVICES IN CODE DIVISION MULTIPLE ACCESS SYSTEMS TECHNICAL FIELD

(71) Applicant: TELEFONAKTIEBOLAGET L M ERICSSON (publ), Stockholm (SE)

(72) Inventor: Andres Reial, Malmö (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 39 days.

(21) Appl. No.: 14/039,705

(22) Filed: Sep. 27, 2013

(65) Prior Publication Data

US 2015/0092896 A1 Apr. 2, 2015

(51) Int. Cl.
 - H03D 1/04 (2006.01)
 - H04L 25/03 (2006.01)
 - H04L 25/02 (2006.01)

(52) U.S. Cl.
 CPC ...... H04L 25/03993 (2013.01); H04L 25/0202 (2013.01)

(58) Field of Classification Search
 CPC .......... H04B 2201/709727; H04B 1/7115; H04B 17/006; H04B 17/0057; H04B 1/71055; H04B 1/7113; H04B 1/709; H04B 1/711; H04B 1/7093; H04B 17/009; H04B 17/0095; H04B 7/0845; H04B 7/0854; H04L 25/0202; H04L 25/0242; H04L 25/497; H04L 25/00; H04L 25/0292; H04L 27/227–27/2278; H04L 1/0091; H04J 13/00
 USPC ............ 375/148, E10.32, 150, 130, 343, 141, 375/152, 142, E1.001, 136, 140; 455/226.1, 455/226.2, 226.3; 370/320
 See application file for complete search history.

(56) References Cited

U.S. PATENT DOCUMENTS 5,465,316 A 11/1995 Tanaka
6,654,408 B1 11/2003 Kadous et al.
(Continued)

FOREIGN PATENT DOCUMENTS

| WO | 9950969 A2 | 10/1999 |
| WO | 2007003680 A1 | 1/2007 |
| WO | 2011066573 A1 | 6/2011 |

OTHER PUBLICATIONS

Ling, F., "Optimal Reception, Performance Bound, and Cutoff Rate Analysis of References-Assisted Coherent CDMA Communications with Applications", IEEE Transactions on Communications, Oct. 1999, pp. 1583-1592, vol. 47, No. 10.
(Continued)

*Primary Examiner* — Rahel Guarino
(74) *Attorney, Agent, or Firm* — Coats & Bennett, PLLC (57) ABSTRACT

A wireless communication device for a CDMA system is configured to generate power estimates with reduced estimation bias. The power estimates may be used for delay estimation, MMSE channel estimation, demodulation, or other purposes. The wireless communication device produces first set of power estimates for a first set of delays and generates a model of the signal powers at the first set of delays as a function of the power leakage from non-aligned signal images in the received signal into the first set of delays. The wireless communication device then computes a second set of power estimates with reduced estimation bias based on the first set of power estimates and the model of the signal powers.

28 Claims, 5 Drawing Sheets

(56) References Cited

U.S. PATENT DOCUMENTS

| | | |
|---|---|---|
| 7,362,792 B2 | 4/2008 | Reial |
| 7,428,262 B2 | 9/2008 | Zancho et al. |
| 7,508,870 B2 | 3/2009 | Denk |
| 7,848,463 B2 | 12/2010 | Li et al. |
| 8,406,344 B2 | 3/2013 | Eitel |
| 2002/0131537 A1 | 9/2002 | Storm et al. |
| 2004/0076333 A1 | 4/2004 | Zhang et al. |
| 2005/0036537 A1 | 2/2005 | Zancho et al. |
| 2005/0152436 A1 | 7/2005 | Reial |
| 2006/0067383 A1 | 3/2006 | Cozzo et al. |
| 2006/0128326 A1 | 6/2006 | Pietraski |
| 2006/0227887 A1 | 10/2006 | Li et al. |
| 2008/0130719 A1 | 6/2008 | Bottomley et al. |
| 2008/0130797 A1 | 6/2008 | Cozzo et al. |
| 2008/0232439 A1 | 9/2008 | Chen |
| 2009/0207955 A1 | 8/2009 | Hoshuyama et al. |
| 2010/0260237 A1 | 10/2010 | Jonsson |
| 2012/0069872 A1 | 3/2012 | Sheu |
| 2012/0106614 A1 | 5/2012 | Kim et al. |
| 2014/0140454 A1 | 5/2014 | Reial |
| 2014/0169503 A1* | 6/2014 | Cohen .......................... 375/329 |

OTHER PUBLICATIONS

Bottomley, G. et al., "Rake Reception With Channel Estimation Error", IEEE Transactions on Vehicular Technology, Nov. 2006, pp. 1923-1926, vol. 55, No. 6.

\* cited by examiner

POWER ESTIMATION FOR WIRELESS COMMUNICATION DEVICES IN CODE DIVISION MULTIPLE ACCESS SYSTEMS

TECHNICAL FIELD

TECHNICAL FIELD

The present invention relates generally to wireless communication devices for code division multiple access (CDMA) systems and, more particularly, to a method and apparatus for determining power estimates.

BACKGROUND

In a wireless communication system, a transmitted signal may travel through multiple propagation paths so that the received signal is a composite of multiple time-shifted versions of the signal. The different time-shifted versions of the transmitted signal, received by the receiver, referred to herein as signal images, suffer from different phase and attenuation effects due to effects of the propagation channel. The multiple time-shifted signal images combine in an unpredictable manner resulting in frequency-dependent fading.

Wireless communication devices for Direct Sequence Code Division Multiple Access (DS-CDMA) systems, such as Wideband CDMA (WCMA)/High Speed Packet Access (HSPA) systems and cdma2000 systems, typically employ an equalizer to combat signal fading due to multi-path propagation. The goal of the equalizer is to detect the individual signal images and combine them coherently to improve the signal quality. A delay processor processes the received signal to identify the multi-path propagation delays corresponding to the individual signal images. Generally, the signal powers of the received signal samples are estimated and a power delay profile (PDP) over a defined search window is generated that describes the signal power as a function of delay. The delays corresponding to the strongest signal images will appear as peaks in the PDP.

To effectively mitigate signal fading, a CDMA receiver needs accurate estimates of the delays associated with the signal images in order to align and coherently combine the signal images. Accurate estimation of the delays starts with accurate power estimates of the received signal samples. The power estimates used for delay estimation may also be used for other purposes, such as Minimum Mean Squared Error (MMSE) channel estimation and demodulation.

Traditional power estimation is performed on a per-delay basis. Channel estimates for a given delay are coherently combined over a range of symbol periods and averaged. The powers of the average channel estimates are then computed, optionally accumulated non-coherently, and averaged to obtain the power estimate. The estimation variance is affected by the number of terms in both averaging steps, while the estimation bias for each delay is primarily determined by the length in time of the temporal accumulation window used for coherent averaging. The estimation bias is due in part to power leakage from strong delays into weak delays, in terms of signal power or magnitude, and in part to other interference leaking into all delays.

When the permissible coherent averaging window is short, e.g. at high vehicular speeds, the resulting estimation bias of the individual power estimates may be large. A large bias in the power estimates makes it difficult to reliably detect the delay structure or the delay spread, which will result in a suboptimal delay configuration of the equalizer and reduced demodulation performance. Using biased average power estimates for MMSE channel estimate scaling may also lead to over-estimating the quality of the initial channel estimates and insufficient suppression of noise.

U.S. published patent application US2005/0152436 (issued as U.S. Pat. No. 7,362,792) discloses one approach to reducing bias in individual power estimates due to power leakage between delays. A noise floor power estimate is computed by looking at the "weak" delays, and that noise floor power estimate is subtracted from the power estimates associated with other delays. The power estimates will thus have a reduced bias for the weaker delays, but the bias for the strong delays may be increased. Furthermore, the noise floor power estimate itself is inherently biased, so heuristic corrective scaling is used to correct for the bias.

Thus, a need remains for a power estimation method that can lower the bias component in the power estimates of the received signal samples for all delays and that does not rely on heuristic correction factors.

SUMMARY

The present disclosure relates to power estimation of a received signal for CDMA receivers. The power estimates may be used for received signal processing, such as delay estimation, MMSE channel estimation, demodulation, or other purposes.

Exemplary embodiments of the disclosure comprise methods implemented in a wireless communication device for a code division multiple access (CDMA) system of processing a received signal with multiple signal images to generate power estimates. The wireless communication device computes a first set of power estimates for a first set of delays and generates a model of the signal powers at the first set of delays as a function of the power leakage from non-aligned signal images in the received signal into the first set of delays. The wireless communication device then computes a second set of power estimates with reduced estimation bias based on the first set of power estimates and the model of the signal powers. The first set of delays may comprise one or more candidate delays for signal despreading, wherein the candidate delays may comprise one or more path delays associated with respective signal images in the received signal and one or more non-path delays not associated with the signal images in the received signal. The first set of power estimates may be initial biased power estimates.

In some embodiments of the method, generating the model of signal powers at the first set of delays as a function of the power leakage from non-aligned signal images into the first set of delays comprises computing an impairment power matrix comprising, for each delay in the first set of delays, one or more matrix elements representing impairment in the first set of estimates due to power leakage from the non-aligned signal images into the first set of delays; and generating the model of the signal power as a function of the impairment power matrix and an impairment power not associated with the signal images in the received signal.

In some embodiments of the method, computing the impairment power matrix further comprises computing one or more matrix elements representing impairment in the first set of power estimates not associated with signal images In some embodiments of the method, computing the second set of power estimates comprises computing least square power estimates based on the first set of power estimates and the impairment power matrix.

In some embodiments, the method further comprises computing impairment power estimates based on the first set of power estimates and the impairment power matrix.

In some embodiments of the method, computing the first set of power estimates comprises generating a set of channel estimates; coherently averaging the channel estimates over one or more coherent accumulation periods; and non-coherently averaging powers of the channel estimates over one or more non-coherent accumulation periods.

In some embodiments of the method, computing the impairment power matrix comprises computing one or more matrix elements of the impairment power matrix as a function of a despreading gain and a coherent accumulation gain.

In some embodiments, the method further comprises generating a power delay profile based on the second set of power estimates.

In some embodiments the method further comprises selecting a finger delay position for a rake equalizer having a plurality of rake fingers based on the power delay profile.

In some embodiments of the method, the method further comprises selecting a tap delay position for at least one filter tap for a chip equalizer having a plurality of filter taps based on the power delay profile.

In some embodiments, the method further comprises generating channel estimates for received signal processing based on the second set of power estimates.

In some embodiments of the method, generating channel estimates for receiver signal processing comprises generating minimum mean squared error channel estimates.

Other embodiments of the disclosure comprise a wireless communication device for a code division multiple access (CDMA) system for processing a received signal with multiple signal images to generate power estimates with reduced estimation bias. The wireless communication device comprises a processing circuit for processing the received signal. The processing circuit is configured to compute a first set of power estimates at a first set of delays; generate a model of signal powers at the first set of delays as a function of the power leakage from non-aligned signal images into the first set of delays; and compute a second set of power estimates with reduced estimation bias based on the first set of power estimates and the model of the signal powers. The first set of delays may comprise two or more candidate delays for signal despreading, wherein the candidate delays may comprise one or more path delays associated with respective signal images and one or more non-path delays not associated with the signal images.

In some embodiments of the wireless communication device, to generate the model of signal powers at the first set of delays, the processing circuit is configured to compute an impairment power matrix comprising, for each delay in the first set of delays, one or more matrix elements representing impairment in the first set of estimates due to power leakage from the non-aligned signal images into the first set of delays; and to generate the model of the signal power as a function of the impairment power matrix and an impairment power not associated with the signal images.

In some embodiments of the wireless communication device, to compute the impairment power matrix, the processing circuit is further configured to compute one or more matrix elements representing impairment in the first set of power estimates not associated with the signal images.

In some embodiments of the wireless communication device, to compute the second set of power estimates, the processing circuit is configured to compute least square power estimates based on the first set of power estimates and the impairment power matrix.

In some embodiments of the wireless communication device, the processing circuit is further configured to compute impairment power estimates based on the first set of estimates and the impairment power matrix.

In some embodiments of the wireless communication device, to compute the first set of power estimates, the processing circuit is configured to generate channel estimates indicative of channel conditions; coherently average the channel estimates over one or more coherent accumulation periods; and non-coherently average powers of the channel estimates over one or more non-coherent accumulation periods.

In some embodiments of the wireless communication device, to compute the impairment power matrix, the processing circuit is configured to compute one or more matrix elements for the impairment power matrix as a function of a despreading gain and a coherent accumulation gain.

In some embodiments of the wireless communication device, the processing circuit is further configured to generate a power delay profile based on the second set of power estimates.

In some embodiments of the wireless communication device, the processing circuit comprises a rake equalizer with a plurality of rake fingers, and wherein the processing circuit is further configured to select a finger delay position for at least one rake finger based on the power delay profile.

In some embodiments of the wireless communication device, the processing circuit comprises a chip equalizer having one or more filter taps, and wherein the processing circuit is further configured to select a tap delay position for at least one filter tap based on the power delay profile.

In some embodiments of the wireless communication device, the processing circuit is further configured to generate channel estimates for demodulation based on the second set of power estimates.

In some embodiments of the wireless communication device, the processing circuit is configured to generate minimum mean squared error channel estimates for demodulation.

Other embodiments of the invention comprise a non-transitory computer readable medium storing computer executable program code for processing a received signal received by a wireless communication device. The program code, when executed by a processor, causes the processor to compute a first set of power estimates at a first set of delays; generate a model of signal powers at the first set of delays as a function of the power leakage from non-aligned signal images in the received signal into the first set of delays; and compute a second set of power estimates with reduced estimation bias based on the first set of power estimates and the model of the signal powers.

DETAILED DESCRIPTION

The present disclosure relates to a method and apparatus for estimating the power of received signal samples in a Code Division Multiple Access (CDMA) receiver. The power estimates may be used for delay estimation, MMSE channel estimation, demodulation, or other purposes.

Figure 1:
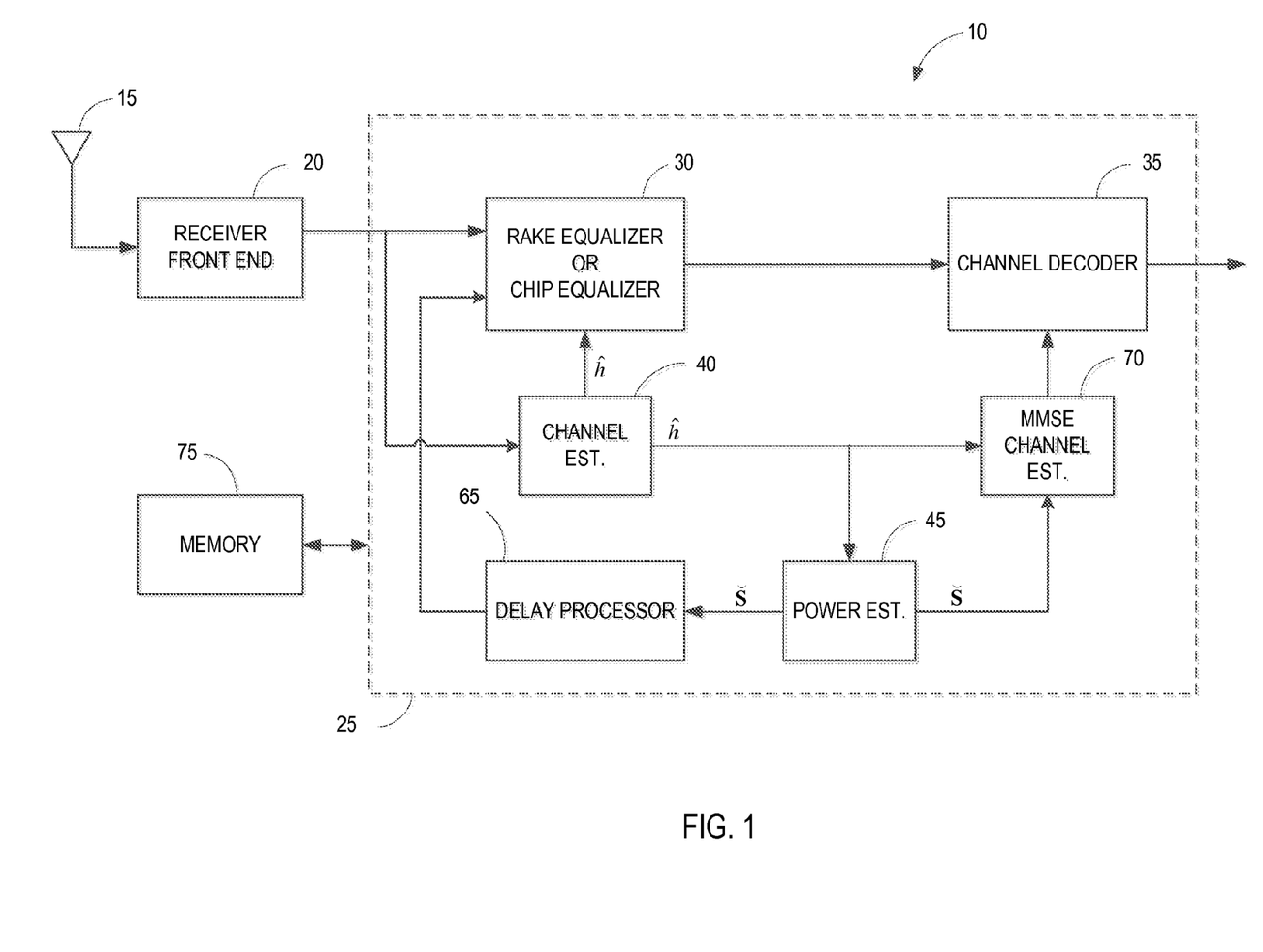
FIG. 1 illustrates a wireless communication device for a code division multiple access system according to one exemplary embodiment of the invention.

FIG. 1 illustrates a wireless communication device 10 for use in a DS-CDMA system, such as a WCDMA/HSPA system or cdma2000 system. The wireless communication device 10 may, for example, comprise a base station, a user equipment, or other radio network node. The wireless communication device 10 comprises a front end circuit 20 connected to one or more antennas 15 and a processing circuit 25. The front end circuit 20 comprises analog circuits to filter, amplify, and downconvert received signals to baseband frequency. The front end circuit 20 further comprises an analog-to-digital converter (ADC) to sample and convert the baseband signals to digital form for processing by the processing circuit 25. The sampling interval may, for example, be one-half the chip period $T_c$. The received signal samples from the receiver front-end circuit 20 are input to the processing circuit 25.

The processing circuit 25 comprises an equalizer 30, a channel decoder 35, a channel estimation circuit 40, a power estimation circuit 45, and a delay processor circuit 65. Some embodiments may further include an MMSE channel estimation circuit 70. The components of the processing circuit 25 may be implemented by one or more processors, hardware, firmware, or a combination thereof. In some embodiments, program instructions executed by the processing circuit may be stored in a memory 75. The memory 75 may comprise any non-transitory computer readable medium, such as a read-only memory (ROM) or random access memory (RAM).

The equalizer 30 equalizes and despreads the received signal samples to obtain an estimate of the received symbol sequence. The equalizer 30 may, for example, comprise a rake equalizer or chip equalizer. The term "rake equalizer" is intended in the broadest sense to include a generalized rake (g-rake) equalizer. The estimated symbol sequence output by the equalizer 30 is input to the channel decoder 35. The channel decoder 35 performs demodulation and decoding to obtain an estimate of the information bits that were transmitted by the transmitter. The channel estimation circuit 40 generates an estimate $\hat{h}$ of the channel between the transmitter and receiver from received pilot symbols. The channel estimates $\hat{h}$ are provided to the equalizer 30, power estimation circuit 45 and, if present the MMSE channel estimation circuit 70. The equalizer 30 uses the channel estimates $\hat{h}$ from the channel estimation circuit 40 to compute combining weights for coherently combining the received signal images as known in the art. The power estimation circuit 45 uses the channel estimates $\hat{h}$ to generate estimates $\check{S}$ of the received signal power at one or more delays. The power estimates $\check{S}$ are provided to the delay processor circuit 65 and possibly the MMSE channel estimation circuit 55. The delay processor circuit 65 uses the power estimates $\check{S}$ to generate a power delay profile (PDP) and to determine the path delays associated with the signal images. In a receiver with a rake equalizer 30, the delay processor circuit 65 uses the PDP to determine finger delay positions (herein "finger delays") for the rake equalizer 30. The finger delays may include both path delays and non-path delays in the case of a g-rake equalizer. In a receiver 10 with a chip equalizer 30, the delay processor circuit 65 uses the PDP to determine tap delays positions (herein "tap delays") for the chip equalizer 30. The MMSE channel estimation circuit 70 uses the initial channel estimates $\hat{h}$ and the power estimates $\check{S}$ to generate MMSE channel estimates $\hat{h}_{mmse}$ for the demodulator 35.

Figure 2:
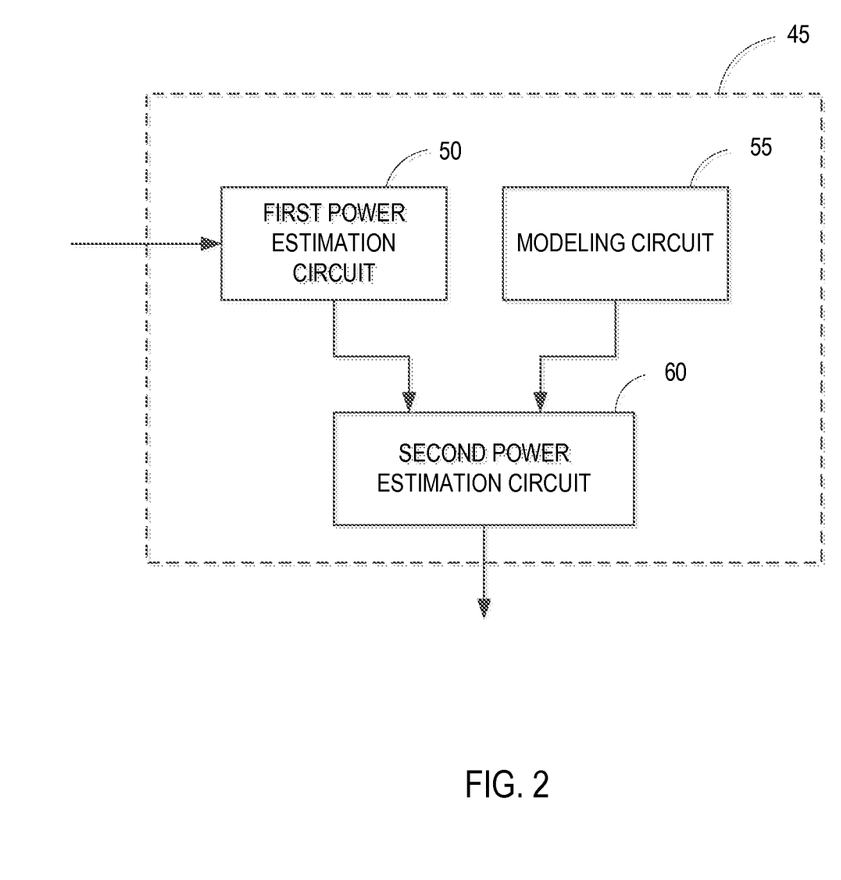
FIG. 2 illustrates a power estimation circuit for a wireless communication device.

FIG. 2 illustrates an exemplary power estimation circuit 45 or the wireless communication device 10. The power estimation circuit 45 comprises a first power estimation circuit 50, a modeling circuit 55, and a second power estimation circuit 60. The first power estimation circuit 50 is configured to compute a first set of power estimates $\hat{S}$ as will be hereinafter described in greater detail. The first set of power estimates $\hat{S}$ include an estimation bias due to power leakage from non-aligned signal images (signal images that are not aligned with a specific delay) and other impairments, such as other cell interference and receiver noise. The modeling circuit 55 generates a signal power model describing the true signal powers at the first set of delays as a function of the power leakage from the non-aligned signal images into the first set delays. The first set of power estimates $\hat{S}$ and the signal power model are input to the second power estimation circuit 60. The second power estimation circuit 60 computes a second set of power estimates with reduced estimation bias based on the first set of power estimates $\hat{S}$ and the signal power model."

For High Speed Downlink Packet Access (HSDPA) in Wideband Code Division Multiple Access (WCDMA) systems, the (temporal) channel estimates $\hat{h}$ for individual path delays are typically obtained by despreading the pilot symbols received on the Common Pilot Channel (CPICH) and de-rotating the resulting symbol estimates to remove the known QPSK symbol. Traditional PDP estimation is performed on a per-delay basis. For a given delay n, for n=1 ... N, the temporal channel estimates $\hat{h}_{n,l}$ are coherently averaged over a range of symbol times l, after which the estimated powers are non-coherently accumulated. The power estimate $\hat{S}_n$ for the nth delay is given by:

$$\hat{S}_n = \frac{1}{N_{nc}} \sum_{i=1}^{N_{nc}} \left| \frac{1}{N_c} \sum_{j=1}^{N_c} \hat{h}_{n,(i-1)N_c+j} \right|^2, \quad (1)$$

where $N_c$ is the number of symbols for coherent accumulation, and $N_{nc}$ is the number of coherently accumulated groups of symbols for non-coherent accumulation. The estimation variance is affected by both averaging steps, while the estimation bias is primarily determined by the coherent averaging length.

Embodiments of the present disclosure generate and use a model of the signal power to remove the estimation bias from the initial biased power estimates. Assume that the vector $\hat{S}=[\hat{S}_1, \hat{S}_2, \ldots, \hat{C}_N]^T$ represents the power estimates for the path delays associated with the signal images. The individual elements of $\hat{S}$ comprise a coefficient specific signal power and a bias term referred to herein as the estimation bias. The estimation bias in signal power estimate at a given delay occurs due to the power leakage during despreading from signal images that are not aligned with that delay, i.e., from signal images other than the specific delay that is being observed/despread (herein referred to as "non-aligned signal images"). An individual element n in $\hat{S}$, corresponding to delay n, has the expected value given by:

$$E[\hat{S}_n] = S_n + \sigma_{e,n}^2, \quad (2)$$

where $S_n = E[h_j]_2]$ is the true average signal power of the channel coefficient and $\sigma_{e,n}^2$ is the estimation bias and E denotes expected value computation."

In HSDPA, the estimation bias is strongly channel coefficient-dependent. For low-magnitude channel coefficients, it is often dominated by the own-cell leakage power from non-aligned signal images. For high-magnitude channel coefficients, other-cell interference may be a stronger contributor to the estimation bias than the own-cell leakage power. The estimation bias may be estimated as:

$$\sigma_{e,n}^2 = \frac{1}{G_{eff}} \frac{1}{N_p \cdot SF} \frac{1}{E_p/I_{or}} \left( \sum_{j \neq n} S_j + \frac{1}{I_{or}/I_{oc}} \sum_j S_j \right) \quad (3)$$

where the first term in the parenthesis describes the leakage power (own-cell interference) and the second term represents other-cell interference and noise. $N_p$ is the number of pilot symbols used to form the initial power estimates (e.g. $N_p=10$ if averaging over one WCDMA slot), $E_p/I_{or}$ is the pilot power allocation at a transmitter, such as a radio base station (RBS), in the embodiment where the wireless communication device 10 is a user equipment), $G_{eff}$ is the effective channel estimation filtering gain depending on the filter response, SF is the spreading factor, and $I_{or}/I_{oc}$ is the geometry factor. The term 1/SF is referred to herein as the despreading gain.

For each initial power estimate of the PDP, the estimation bias $\sigma_{e,n}^2$ for delay position n, equals the sum of the power leakage from all signal images that are not aligned with the delay position n (herein referred to as "non-aligned signal images") plus a non-modeled interference term due to e.g. other-cell interference and receiver noise. Thus, the relationship between the initial biased power estimates $\hat{S}$ and the true signal powers S of the channel coefficients can be modeled as:

$$E\begin{bmatrix} \hat{S} \\ \hat{Z} \end{bmatrix} = A \begin{bmatrix} S \\ \sigma_o^2 \end{bmatrix} \quad (4)$$

In Equation (4), $\hat{Z}=[\hat{Z}_1 \ldots \hat{Z}_M]^T$ is the estimated power of $M \geq 1$ additional delay positions not associated with signal images that are assumed not to contain own-cell signal energy or, alternatively expressed, delay positions that do not overlap any of the multi-path delays of the individual signal images (herein referred to as "non-path delays"), e.g. based on previous PDP or cell search results, $$\sigma_o^2 = \frac{1}{I_{or}/I_{oc}} \sum_j |h_j|^2$$

is the non-modeled impairment power (e.g., other-cell, thermal noise, etc.), and A is a matrix representing impairments due to power leakage from non-aligned signal images, other-cell interference, and receiver noise. The impairment power matrix A may have dimensions $(N+M) \times (N+1)$ and be written as:

$$A = \begin{bmatrix} 1 & q & \cdots & q & q \\ q & 1 & \ddots & \vdots & q \\ \vdots & q & \ddots & q & \vdots \\ q & q & \cdots & 1 & q \\ q & q & \cdots & q & q \\ \vdots & \vdots & \ddots & \vdots & \vdots \\ q & q & \cdots & q & q \end{bmatrix} \quad (5)$$

where q is a suppression factor that represents the suppression of the impairments in the despread signals. In one embodiment, the leakage suppression factor q is given by:

$$q = \frac{1}{N_c \cdot SF} \quad (6)$$

The suppression factor q accounts for the processing gain from despreading the pilot symbols used for channel estimation and coherently averaging the channel estimates.

Each row of the impairment power matrix A represents one delay in the first set of delays for despreading. The impairment power matrix A includes N+M rows. The first N rows represent delays corresponding to or associated with respective signal images in the received signal. The last M rows represent candidate delays (non-path delays) that are not associated with the signal images in the received signal. The impairment power matrix A includes N+1 columns. The first N columns represent impairments corresponding to signal images in the received signal. The last column represents impairments that are not associated with the signal images in the received signal, that is, impairments that originate from other sources, e.g. other cells or noise, than the signal images. As an example, assume that the first set of delays comprises 3 path delays, that are associated with signal images (N=3) and 2 non-path delays, that are not associated with signal images (M=2). In this case, the impairment power matrix would be a 5×4 matrix.

Assuming that sufficient non-coherent accumulation has been performed to obtain relatively low initial estimation bias power, reduced-bias signal power estimates $\check{S}$ for all delays may be computed using least squares estimation (LSE) techniques, e.g. a pseudo-inverse approach according to:

$$\begin{bmatrix} \check{S} \\ \check{\sigma}_o^2 \end{bmatrix} = (A^H A)^{-1} A^H \begin{bmatrix} \hat{S} \\ \hat{Z} \end{bmatrix} \quad (7)$$

The reduced-bias power estimates $\check{S}$ may then be used in subsequent receiver processing in place of $\hat{S}$. Those skilled in the art will appreciate that other LSE solution techniques may be used to compute the reduced-bias power estimates $\check{S}$, e.g. orthogonal decomposition methods like QR-, Cholesky-, or singular value decompositions.

An arbitrary number M>=1 non-path delays may be used to improve the least square fitting quality. The number of path delays N in the first set of delays should, however, be kept as low as possible, to minimize the number of terms to be fitted, i.e., the LSE order.

In some cases the non-modeled impairment power estimate $\check{\sigma}_o^2$ may be previously available. The least square solution in this case is given by:

$$\check{S} = (A^H A)^{-1} A^H \left( \begin{bmatrix} \hat{S} \\ \hat{Z} \end{bmatrix} - \check{\sigma}_o^2 \right), \quad (8)$$

where the impairment power matrix A is modified to omit the last column of A.

In a multi-antenna receiver 10, the estimation process described above may be applied separately to each antenna 15.

The procedures described above may be modified depending on the resolution of the power estimates. For a chip-spaced grid, the impairment power matrix A shown in Equation 5 may be used. For a ½ chip-spaced grid, only delays with integer chip-spacing should be considered to contribute leakage energy. In this case, every even element in odd rows and columns of the impairment power matrix A, and every odd element in even rows and columns, except the last column, should be set to zero. For arbitrary spacing or an irregular grid, interpolation according to methods known in the art may be applied to the initial PDP to obtain chip-spaced samples for each candidate delay. In some embodiments, the leakage suppression factor q may additionally depend on channel estimate filtering choices, e.g. if the coherent filter step is more advanced than simple averaging, or if it is designed to allow some degree of bias. Thus, in some embodiments, the leakage suppression factor q may be different for different matrix elements.

Figure 3:
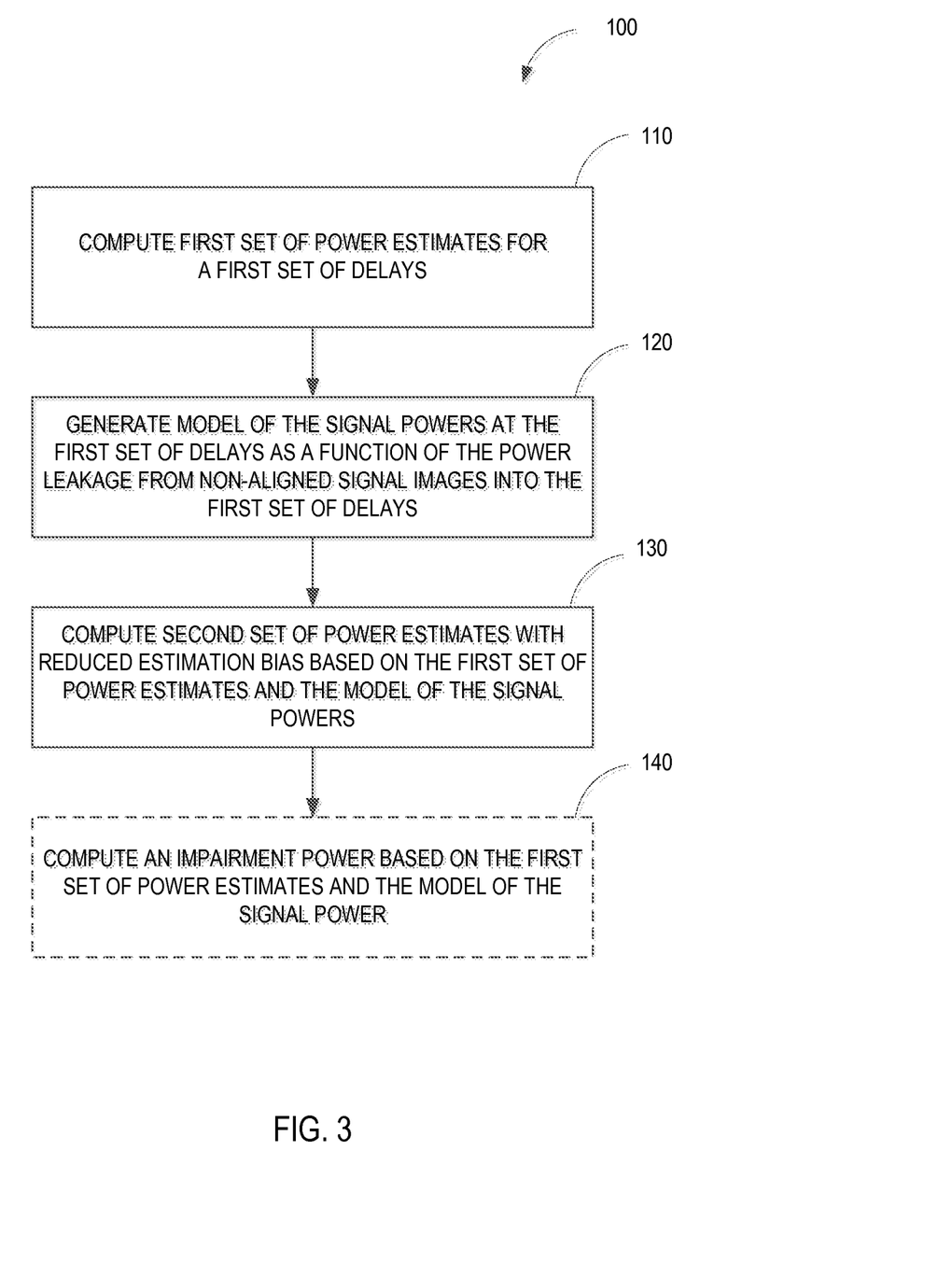
FIG. 3 illustrates a method implemented by the wireless communication device of computing power estimates using a power leakage model.
Figure 5:
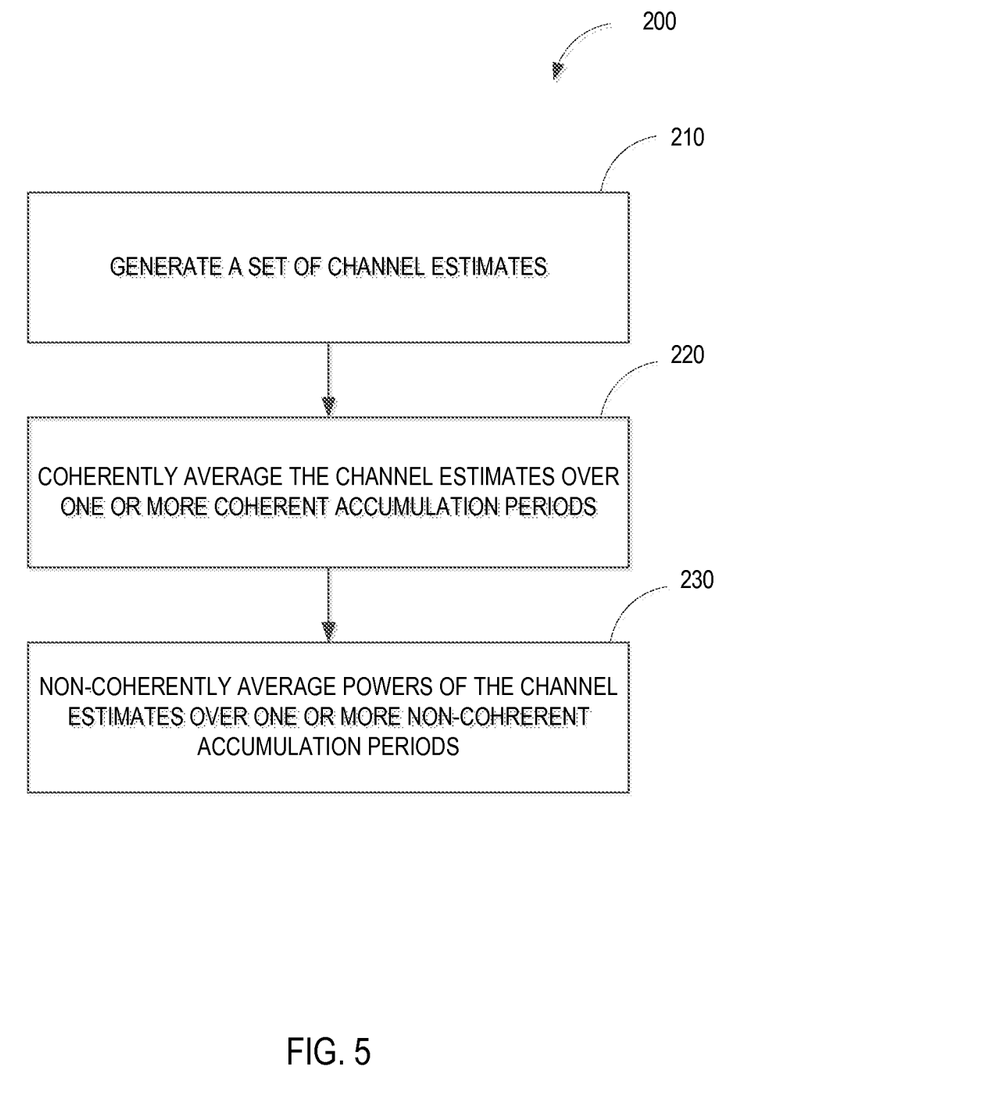
FIG. 5 illustrates a method implemented by the wireless communication device of computing initial power estimates.

FIG. 3 illustrates an exemplary method 100 implemented by a wireless communication device 10 of generating power estimates with reduced estimation bias. The wireless communication device 10 computes a first set of biased power estimates at a first set of delays (block 110). The first set of power estimates may be computed according to known methods. One exemplary method is shown in FIG. 5 and is described in more detail below. The wireless communication device 10 also generates a model of the signal powers at the first set of delays as a function of the power leakage from non-aligned signal images (block 120). The wireless communication device 10 then computes a second set of power estimates with reduced estimation bias based on the first set of power estimates and the model of the signal powers (block 130). In some embodiments, the wireless communication device 10 may also optionally compute an impairment power estimate based on the first set of power estimates and the model of the signal powers (block 140). The impairment power represents non-modeled interference such as other cell interference, thermal noise, etc.

Figure 4:
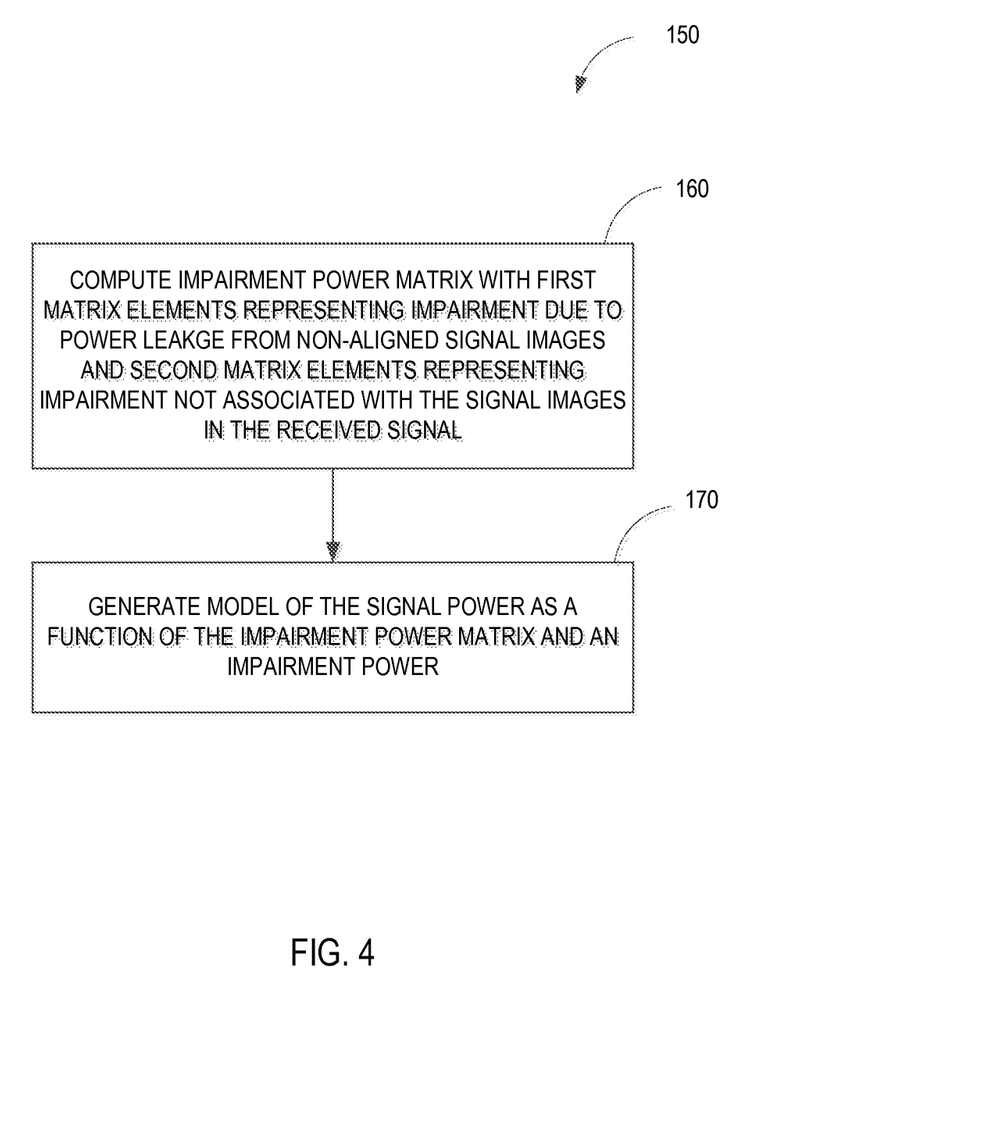
FIG. 4 illustrates a method implemented by the wireless communication device of generating a power leakage model used for computing power estimates.

FIG. 4 illustrates an exemplary method 150 for generating the power leakage model. The wireless communication device 10 is configured to compute an impairment power matrix A with first matrix elements representing power leakage from the non-aligned signal images into the first set of delays and second matrix elements representing other impairments not due to power leakage from the non-aligned signal images (block 160). The wireless communication device 10 then generates the model of the signal powers as a function of the impairment power matrix and an impairment power representing non-modeled interference, such as other cell interference, thermal noise, etc (block 170). The signal power model is shown in Eq. 4.

FIG. 5 illustrates a method 200 implemented by the wireless communication device 10 of computing the initial biased power estimates. The method 200 may be used at block 110 in FIG. 1 compute the first set of power estimates for the first set of delays, which are initially biased. The wireless communication device 10 generates channel estimates on a per delay basis (block 210). The channel estimates may be generated using known methods based on common pilot signals. The channel estimates are coherently accumulated and averaged over one or more coherent accumulation periods (block 220). Then the powers of the average channel estimates are non-coherently accumulated and averaged over one or more non-coherent accumulation periods (block 230). The average powers are used as the first set of power estimates, which are initial biased power estimates.

The power estimation techniques are able to produce substantially unbiased power estimates for all delays, both with weak and strong own-cell power, and do not require heuristic scaling corrections. By reducing or, in some cases, fully removing the bias component, the power estimation techniques enable generation of significantly higher-quality signal power or PDP estimates. These may be used for other algorithms beyond path search and PDP center of gravity computation, e.g. for improved MMSE channel estimation, improving overall demodulation performance, data throughput, network capacity and user experience. Computational complexity of the method is low because the unbiased PDP update is performed relatively infrequently.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, micro-code, etc.) that runs on a processor such as a digital signal processor, which may collectively be referred to as "circuitry," "a module" or variants thereof.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method, implemented by a code division multiple access (CDMA) wireless communication device, for processing a received signal with multiple signal images to generate power estimates, the method comprising:
   computing a first set of power estimates at a first set of delays;
   generating a model of signal powers at the first set of delays as a function of power leakage from non-aligned signal images in the received signal into the first set of delays; and
   computing a second set of power estimates with reduced estimation bias based on the first set of power estimates and the model of the signal powers.

2. The method of claim 1 wherein generating the model of signal power at the first set of delays as the function of the power leakage from the non-aligned signal images into the first set of delays comprises:
   computing an impairment power matrix comprising, for each delay in the first set of delays, one or more matrix elements representing impairment in the first set of estimates due to power leakage from the non-aligned signal images in the received signal into the first set of delays; and
   generating the model of the signal power as a function of the impairment power matrix and an impairment power not associated with the signal images in the received signal.

3. The method of claim 2 wherein computing the impairment power matrix further comprises computing, for each delay in the first set of delays, one or more matrix elements representing impairment in the first set of power estimates not associated with the signal images in the received signal.

4. The method of claim 2 wherein computing the second set of power estimates comprises computing least square power estimates based on the first set of power estimates and the impairment power matrix.

5. The method of claim 2 further comprising computing impairment power estimates based on the first set of estimates and the impairment power matrix.

6. The method claim 2 wherein computing the first set of power estimates comprises:
   generating a set of channel estimates;
   coherently averaging the channel estimates over one or more coherent accumulation periods; and
   non-coherently averaging powers of the channel estimates over one or more non-coherent accumulation periods.

7. The method of claim 6 wherein generating the impairment power matrix comprises computing one or more matrix elements of the impairment power matrix as a function of a despreading gain and a coherent accumulation gain.

8. The method of claim 1 further comprising generating a power delay profile based on the second set of power estimates.

9. The method of claim 8 wherein the wireless communication device further comprises a rake equalizer or generalized rake receiver having a plurality of rake fingers, and wherein the method further comprises selecting a finger delay position for the rake equalizer based on the power delay profile.

10. The method of claim 8 wherein the wireless communication device comprises a chip equalizer having a plurality of filter taps, and wherein the method further comprises selecting a tap delay position for at least one filter tap based on the power delay profile.

11. The method of claim 1 further comprising generating channel estimates for received signal processing based on the second set of power estimates.

12. The method of claim 11 wherein generating channel estimates for receiver signal processing comprises generating minimum mean squared error channel estimates.

13. The method of claim 1 wherein the first set of delays comprises two or more candidate delays for signal despreading, and wherein the candidate delays comprise one or more path delays associated with respective signal images in the received signal and one or more non-path delays not associated with said signal images in said received signal.

14. A wireless communication device for a code division multiple access system, the wireless communication device comprising a processing circuit for processing a received signal comprising multiple signal images to generate power estimates, the processing circuit configured to:
   compute a first set of power estimates at a first set of delays;
   generate a model of signal powers at the first set of delays as a function of power leakage from non-aligned signal images in the received signal into the first set of delays; and
   compute a second set of power estimates with reduced estimation bias based on the first set of power estimates and the model of the signal powers.

15. The wireless communication device of claim 14 wherein, to generate the model of signal powers at the second delays, the processing circuit is further configured to:
   compute an impairment power matrix comprising, for each delay in the first set of delays, one or more matrix elements representing impairment in the first set of estimates due to power leakage from the non-aligned signal images in the received signal into the first set of delays; and
   generate the model of the signal power as a function of the impairment power matrix and an impairment power not associated with the signal images in the received signal.

16. The wireless communication device of claim 15 wherein, to compute the impairment power matrix, the processing circuit is further configured to compute one or more matrix elements for the impairment power matrix representing impairment in the first set of estimates not associated with signal images in the received signal.

17. The wireless communication device of claim 15 wherein, to compute the second set of power estimates, the processing circuit is further configured to compute least square power estimates based on the first set of power estimates and the impairment power matrix.

18. The wireless communication device of claim 15 wherein the processing circuit is further configured to compute impairment power estimates based on the first set of power estimates and the impairment power matrix.

19. The wireless communication device of claim 15 wherein, to compute the first set of power estimates, the processing circuit is further configured to:
   generate channel estimates indicative of channel conditions;

coherently average the channel estimates over one or more coherent accumulation periods; and non-coherently average powers of the channel estimates over one or more non-coherent accumulation periods.

20. The wireless communication device of claim 19 wherein, to compute the impairment power matrix, the processing circuit is further configured to compute one or more matrix elements for the impairment power matrix as a function of a despreading gain and a coherent accumulation gain.

21. The wireless communication device of claim 14 wherein the processing circuit is further configured to generate a power delay profile based on the second set of power estimates.

22. The wireless communication device of claim 21 wherein the processing circuit further comprises a rake equalizer with a plurality of rake fingers, and wherein the method further comprises selecting a finger delay position for at least one rake finger based on the power delay profile.

23. The wireless communication device of claim 21 wherein the processing circuit further comprises a chip equalizer having one or more filter taps, and wherein the method further comprises selecting a tap delay position for at least one filter tap based on the power delay profile.

24. The wireless communication device of claim 14 wherein the processing circuit is further configured to generate channel estimates for demodulation based on the second set of power estimates.

25. The wireless communication device of claim 14 wherein the processing circuit is further configured to generate minimum mean squared error channel estimates for demodulation.

26. The wireless communication device of claim 14 wherein the first set of delays comprises two or more candidate delays for signal dispreading and wherein the second set of delays comprises one or more path delays associated with respective signal images.

27. The wireless communication device of claim 14, wherein the processing circuit comprises:
    a first power estimation circuit configured to compute the first set of power estimates at the first set of delays;
    a modeling circuit configured to generate the model of signal powers at the first set of delays as a function of the power leakage from non-aligned signal images in the received signal into the first set of delays; and
    a second power estimation circuit configured to compute the second set of power estimates with reduced estimation bias based on the first set of power estimates and the model of the signal powers.

28. A non-transitory computer readable medium storing computer executable program code for processing a received signal received by a wireless communication device, said program code, when executed by a processor, causes the processor to:
    compute a first set of power estimates at a first set of delays;
    generate a model of signal powers at the first set of delays as a function of power leakage from non-aligned signal images in the received signal into the first set of delays; and
    compute a second set of power estimates with reduced estimation bias based on the first set of power estimates and the model of the signal powers.

* * * * *

UNITED STATES PATENT AND TRADEMARK OFFICE
CERTIFICATE OF CORRECTION

PATENT NO. : 9,071,482 B2
APPLICATION NO. : 14/039705
DATED : June 30, 2015
INVENTOR(S) : Reial It is certified that error appears in the above-identified patent and that said Letters Patent is hereby corrected as shown below:

On the Title Page, in Item (54), under "TITLE", in Column 1, Line 4, delete "TECHNICAL FIELD".

IN THE SPECIFICATION

In Column 1, Line 4, delete "TECHNICAL FIELD".

In Column 5, Line 52, delete "circuit 55." and insert -- circuit 70. --, therefor.

In Column 5, Line 67, delete "or the" and insert -- for the --, therefor.

In Column 6, Line 47, delete "$\hat{S}=[\hat{S}_1, \hat{S}_2, \ldots, \hat{C}_N]^T$" and insert -- $\hat{S} = [\hat{S}_1, \hat{S}_2, \ldots, \hat{S}_N]^T$ --, therefor.

In Column 6, Line 60, delete "$S_n = E[h_j|_2]$" and insert -- $S_n = E[|h_j|^2]$ --, therefor.

In Column 10, Line 57, delete "(DVD/BlueRay)" and insert -- (DVD/BluRay) --, therefor.

IN THE CLAIMS

In Column 11, Line 52, in Claim 6, delete "method claim" and insert -- method of claim --, therefor.

Signed and Sealed this
Fifteenth Day of March, 2016

Michelle K. Lee
*Director of the United States Patent and Trademark Office*